July 7, 1925.
G. D. SUNDSTRAND
MEANS FOR SUPPORTING THE FREE ENDS OF PROJECTING
ELEMENTS OF METAL WORKING MACHINES
Filed Dec. 15, 1920
1,545,215
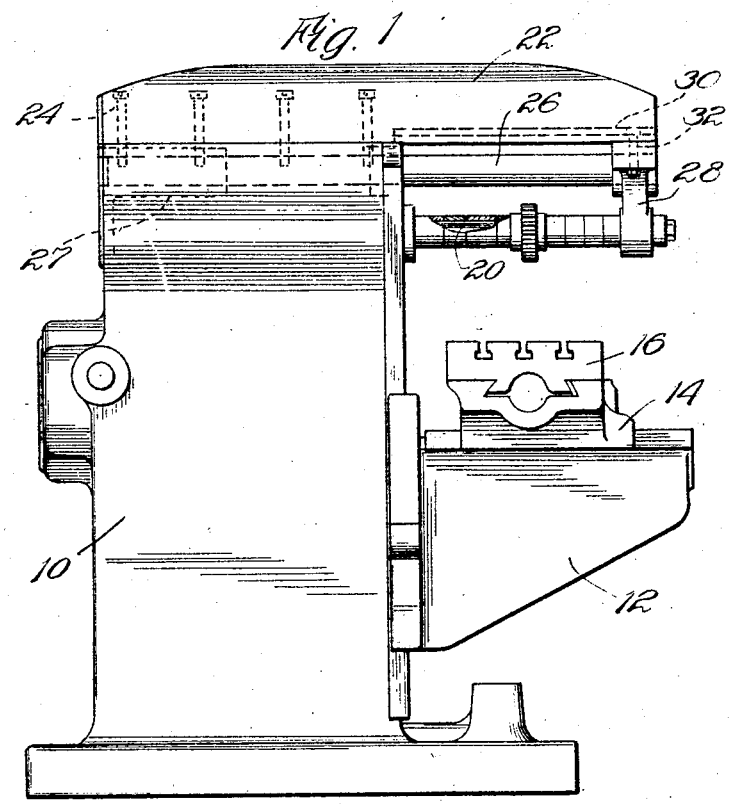
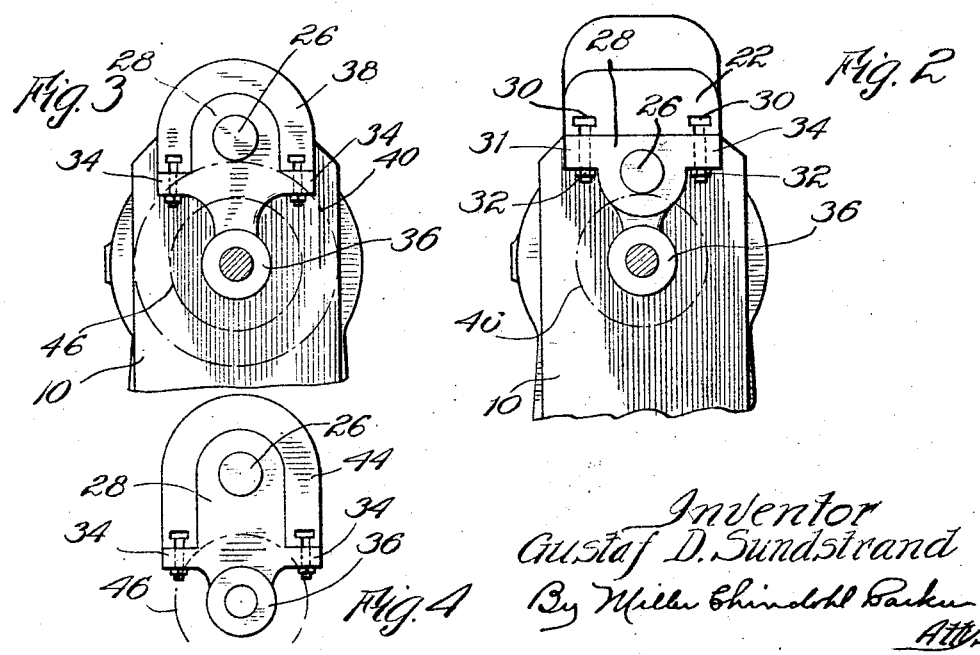
Inventor
Gustaf D. Sundstrand
By Miller Chindahl Parker
Attys Patented July 7, 1925.

1,545,215

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

MEANS FOR SUPPORTING THE FREE ENDS OF PROJECTING ELEMENTS OF METAL-WORKING MACHINES.

Application filed December 15, 1920. Serial No. 430,914.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Means for Supporting the Free Ends of Projecting Elements of Metal-Working Machines, of which the following is a specification.

My invention relates to metal working machinery and more specifically to an improvement in the means for providing an outboard support for rotary spindles or arbors projecting from the bodies of such machines.

One object of my invention is to provide means for readily displacing such an outboard support to permit of the removal of the cutter or piece of work mounted on the spindle or arbor.

Another object is to provide means for permitting this motion by withdrawing the arbor support longitudinally from the arbor without requiring the arbor support to be moved precisely to any predetermined point.

Another object is to provide for easy replacement of the outboard support in operative position regardless of slight inaccuracies in the alinement of the parts.

Another object is to materially increase the rigidity with which the arbor support may be clamped in position while the machine is in operation.

Further objects and advantages of my invention will become apparent as the description proceeds.

In the accompanying drawings, Fig. 1 is a side view of a well known type of milling machine illustrating the application of my invention thereto. Fig. 2 is a fragmentary end view of the parts shown in Fig. 1. Fig. 3 is an end view of a slightly modified form, and Fig. 4 is an end view of still another modification.

In the embodiment of my invention selected for illustration, my improved supporting means is illustrated in connection with a milling machine having a column 10, a knee 12, saddle 14 and table 16 mounted in the well known manner. The arbor or spindle 20 projects past the work table and must be supported at its outer end during the cutting operation.

According to my invention, a main arm 22 projects from the column in parallel spaced relation with the arbor 20. This main arm may be cast integral with the column 10, but I prefer to make it of a separate piece and fasten it permanently in place by means of bolts 24.

A cylindrical arm 26 also extends parallel to the arbor 20 being slidably mounted in the column 10 in any suitable way, as, for instance, by means of an elongated bearing at 27 and carrying an arbor support 28 permanently associated therewith to form a rigid unit. In the form shown in Fig. 2 the main arm 22 is in part substantially rectangular in cross section, which part has T-slots 30 in its lower face receiving the heads of bolts 32 passing through laterally directed portions 34 formed on the arbor support, by means of which the arbor support may be rigidly clamped to the main arm. When this is done, both arms and the arbor support form a single rigid unit to firmly support and guide the rotating end of the arbor. Upon loosening the bolts 32 the cylindrical arm and arbor support may be readily slid away from the column to carry the bolts out of the T-slots and the arbor support past the end of the main arm, after which the cylindrical arm and arbor support may be readily rotated around the axis of the cylindrical arm to carry the bearing 36 of the arbor support laterally away from the axis of the arbor and permit ready removal of the cutter or piece of work carried thereby.

It will be apparent that the main arm may be made as heavy as desired to provide the necessary rigidity, and that after loosening the bolts the workman can pull the cylindrical arm and arbor support toward him without taking pains to arrest their motion at any definite point, leaving them free to be pushed out of the way as the cutter or piece of work is removed from the arbor.

In Fig. 3 I have illustrated an alternative construction in which the cylindrical arm 26 is partly housed by the main arm 38, the construction being in every other respect identical with that shown in Fig. 2.

In large manufacturing establishments using a considerable number of machines of this type with cutters or work blanks of various sizes, the largest size of cutter or blank is used only at relatively rare intervals. It will be apparent that the type of construction herein disclosed permits of a design according to Fig. 3 in which a cutter having a diameter indicated by the dot and dash line 40 may be employed; and that by a slight change in the cross section of the main arm 38 and the positioning of the portions 34 of the arbor support, a much more rigid construction such as that illustrated in Fig. 4 may be provided for some of the machines without changing any other parts except the main arm and arbor support. In this figure it will be noted that the sides of the main arm 44 have been carried downward to provide a deep U-shaped cross section of great rigidity, without limiting the operative capacity of the machine in any way except that it limits the size of cutter which may be used to that indicated on Figs. 2, 3 and 4 by the line 46.

It should be noted that the bolts 32 may and ordinarily should be a rather loose fit in the slots. Arms 22, 38 and 44, however, provide plane surfaces against which the support 28 may be clamped to draw it into perfect alinement. Shaft 26 may easily be one or two thousandths of an inch out of perfect alinement, due to the weight of support 28 or to slight inaccuracies in the construction of the machine, but the parts may nevertheless be readily separated and brought together again with the axes of arbor 20, arm 22 and shaft 26 all positioned in the same place as before.

It will be obvious that supporting means according to my invention may be applied to any machine tool having a projecting rotor element, whether the element rotates around a horizontal or vertical axis and whether it carries a cutter or a piece of work. Many variations and modifications of my invention will naturally occur to those skilled in the art. I aim in the subjoined claims to cover all legitimate modifications and variations of my invention.

I claim as my invention:

1. In a machine tool, a body, an element projecting from the body and acting to primarily receive the force exerted by the cutting tool, a cylindrical arm projecting from said body, an outboard support rigidly associated with said cylindrical arm, said cylindrical arm being axially slidable and rotatable with respect to the body, and a rigid arm projecting from the body having a non-cylindrical cross section and operating when the outboard support is in operative position as a base to which the outboard support may be clamped for rigidly bracing the same against motion of any sort.

2. In a machine tool, the combination with a body and an arbor, of two arms projecting from said body, one of said arms being permanently and rigidly associated with said body, an outboard support associated with the other of said arms, and adjustable means for clamping said outboard support to the first arm with the axes of the arbor and arms coplanar.

3. In a machine tool, the combination with a body and an arbor, of two arms projecting from said body, one of said arms having vertical sides between the planes of which the other arm is disposed, said first arm being rigidly associated with said body, an outboard support associated with the second arm, and adjustable means for clamping the outboard support to the first arm.

4. In a machine tool, in combination, a body, two arms projecting from said body, one arm being circular and the other being non-circular, an outboard support associated with the circular arm, and means including headed bolts engaging in T-slots for clamping the support to the non-circular arm.

5. In a machine tool, a body, two arms projecting from said body, one arm being disposed in the space under the other arm, an outboard support associated with one of said arms, and means for clamping said support to the other arm.

6. A milling machine having, in combination, a column, a main arm overlying the upper end of the column and secured thereto and projecting forwardly from the column, said arm having a plane lower face, a horizontal cylindrical arm mounted in the column below the main arm for pivotal and sliding movement, an arbor support rigidly secured to the forward end of the cylindrical arm, said arbor support having a plane upper end, means for clamping the upper end of said arbor support to the lower face of the main arm, and an arbor located in the vertical plane of the axis of the cylindrical arm, the outer end of said arbor being carried by said arbor support.

7. In a machine tool, a body, two parallel arms projecting from said body, an outboard support associated with one arm, and means for clamping said support to the other arm to hold it rigidly and accurately in alinement, said means comprising elements engaging said outboard support and said arm for clamping said support against the surface of said arm.

8. A milling machine having, in combination, a column, a main arm overlying the upper end of the column and secured thereto and projecting forwardly from the column, said arm having a plane lower face, a horizontal cylindrical arm slidably mounted in the column below the main arm, an arbor support mounted on the forward end of the cylindrical arm, said arbor support having a plane upper end, means for clamping the upper end of said arbor support to the lower face of the main arm, and an arbor the outer end of which is carried by said arbor support.

9. A milling machine having, in combination, a column, a main arm secured to the upper end of the column and projecting forwardly therefrom, said arm having a plane lower face, a horizontal arm slidably mounted in the column below the main arm, an arbor support mounted on the forward end of the slidable arm, said arbor support having a plane upper end, means for clamping the upper end of said arbor support to the lower face of the main arm, and an arbor, the outer end of which is carried by said arbor support.

10. In a machine tool, a body, a cylindrical arm and a non-cylindrical arm projecting from the body in parallel spaced relationship, an outboard support permanently associated with said cylindrical arm and having a surface normally abutting one surface of the non-cylindrical arm, and means for clamping the outboard support to the non-cylindrical arm.

11. In a machine tool, the combination with a body and an arbor, of two arms projecting from the body, one of said arms being permanently and rigidly associated with the body, an outboard support associated with the other arm whereby the support is slidable with respect to the body in a line parallel to the first arm, the first arm having planar portions thereon, and the support having planar portions thereon adapted to abut the planar portions of the first arm, and clamping means between the first arm and the support whereby the planar portions are rigidly held together.

12. In a machine tool, a body, a cylindrical arm and a second arm projecting from the body in parallel spaced relation thereto, the second arm having substantially vertical sides terminating in a substantially horizontal plane, an outboard support permanently associated with said cylindrical arm and having planar portions normally abutting the non-cylindrical arm at the aforesaid planar portions, and means for clamping the outboard support to the non-cylindrical arm.

13. A milling machine having, in combination, a column, a main arm overlying the upper end of the column secured thereto and projecting forwardly from the column, said arm having a plane lower face, a horizontal cylindrical arm mounted in the column in the space under the main arm for pivotal and sliding movement, an arbor support rigidly secured to the forward end of the cylindrical arm, said arbor support having a plane surface at its upper end, means for clamping the upper end of said arbor support to the plane face of the main arm, and an arbor located in the vertical plane of the axis of the cylindrical arm, the outer end of said arbor being carried by said support.

14. A milling machine having, in combination, a column, a main arm overlying the upper end of the column and secured thereto and projecting forwardly on the column, said arm having a plane lower face, a horizontal cylindrical arm slidably mounted in the column in the space under the main arm, an arbor support mounted on the forward end of the cylindrical arm, said arbor support having a plane face at its upper end, means for clamping said plane face of the arbor support to the plane face of the main arm, and an arbor the outer end of which is carried by said arbor support.

15. A milling machine having, in combination, a column, a main arm secured to the upper end of the column and projecting forwardly therefrom, said arm having a plane lower face, a horizontal arm slidably mounted in the column in the space under the main arm, an arbor support mounted on the forward end of the slidable arm, said arbor support having a plane face on its upper end, means for clamping the plane face of the arbor and support to the plane face of the main arm, and an arbor, the outer end of which is carried by said support.

In testimony whereof, I have hereunto set my hand.

GUSTAF DAVID SUNDSTRAND.